United States Patent [19]

Kozakiewicz et al.

[11] Patent Number: 5,037,863

[45] Date of Patent: Aug. 6, 1991

[54] EMULSIFIED FUNCTIONALIZED POLYMERS

[76] Inventors: Joseph J. Kozakiewicz, 54 Barnswallow Dr., Trumbull, Conn. 06611; David L. Dauplaise, 76 Valleyview Ct., Norwalk, Conn. 06851; Joseph M. Schmitt, P.O. Box 336, Ridgefield, Conn. 06877; Sun-Yi Huang, 106 New England Dr., Stamford, Conn. 06903

[21] Appl. No.: 537,661

[22] Filed: Jun. 13, 1990

Related U.S. Application Data

[60] Division of Ser. No. 428,704, Oct. 30, 1989, which is a continuation-in-part of Ser. No. 286,078, Dec. 19, 1988.

[51] Int. Cl.$^5$ .................. C08K 7/16; D21H 17/00
[52] U.S. Cl. .................. 523/223; 524/827; 524/829; 524/831; 525/328.4; 525/329.4; 525/379; 526/306
[58] Field of Search ............... 523/223; 524/827, 829, 524/831; 525/328.4, 329.4, 379; 526/306

[56] References Cited

U.S. PATENT DOCUMENTS 4,681,912  7/1987  Durand et al. .................. 524/827

Primary Examiner—Paul R. Michl
Assistant Examiner—T. McDonald, Jr.
Attorney, Agent, or Firm—Frank M. Van Riet

[57] ABSTRACT

Functionalized polymer microparticles having particle diameters of from about 200 to about 4000Å are prepared and are useful in facilitating a variety of flocculation and thickening of dispersions of suspended solids applications.

20 Claims, No Drawings

EMULSIFIED FUNCTIONALIZED POLYMERS

This is a divisional of copending application Ser. No. 07/428,704 filed on Oct. 30, 1989 which in turn, is a CIP of application Ser. No. 07/286,078 filed Dec. 19, 1988.

su

The present invention relates to functionalized, water-soluble polymer microparticles and their preparation.

BACKGROUND OF THE INVENTION

Functionalized, water-soluble polymers are well known in the art and are useful in a variety of applications. A major drawback of many functionalized polymers is their tendency to cross-link, this problem becoming more severe as the polymer solids content or the molecular weights thereof is increased. Attempts to reduce the tendency of such polymers to cross-link have proven less than satisfactory.

For example, high molecular weight Mannich acrylamide polymers (PAMS) are well known and are used in a variety of flocculant applications. A major drawback of Mannich PAMS is their tendency to cross-link. This problem becomes more severe as the polymer solids are increased. Consequently, these polymers are generally made as dilute aqueous solutions in an attempt to slow down the rate of interpolymer cross-linking. The solids level must also be kept low, particularly for very high molecular weight Mannich PAMS, owing to the ability of these polymers to viscosify water. As a result, solids levels of very high molecular weight Mannich PAMS must generally be well below 10%, and more typically 6% or less so that the solutions can be pumped and handled conveniently.

Several approaches have been tried to overcome these problems. One approach has been to make the Mannich PAMS at the site of use by inverting high solids inverse emulsion PAMS in water containing dialkylamines and formaldehyde. U.S. Pat. No. 4,021,394 and U.S. Pat. No. 4,022,741 describe continuous processes for the preparation of Mannich PAMS which entails inverting an inverse emulsion PAM in a process stream containing formaldehyde and a secondary amine and subjecting the stream to turbulence by in-line mixing to produce an 1–15% aqueous solution of Mannich PAM. This approach, however, suffers from the need to store multiple chemicals on site and from the problems inherent in running chemical reactions at such locations. Another approach has been to prepare dry Mannich PAMS, as described in U.S. Pat. No. 3,864,312; U.S. Pat. No. 3,539,535 and U.S. Pat. No. 3,790,529, or blends of dry PAMS with dry, low-molecular weight Mannich-base forming compounds which, when dissolved in water, react to produce Mannich PAMS, as described in EPO 210,784. These approaches, in general, suffer from cross-linking problems, the reversibility of the Mannich reaction, the difficulty and length of time required to dissolve high molecular weight polymers, and other problems. Another approach has been to make the Mannich PAM in inverse emulsions, such as described in U.S. Pat. No. 3,979,348 and U.S. Pat. No. 4,093,542 and U.S. Pat. No. 4,010,131. While this approach produces a product with substantially higher solids, the average particle size thereof ranges from 10,000–20,000 Å in diameter, and consequently, cross-linking of the thousands of polymer chains in each particle renders the products ineffective. The cross-linking rate can be reduce somewhat by adding fairly large quantities of stabilizers such as described in U.S. Pat. No. 4,113,685 and U.S. Pat. No. 4,073,763, but cross-linking continues and the products thus possess a very limited shelf life.

Water-soluble, glyoxalated acrylamide polymer wet strength agents are disclosed in Coscia, U.S. Pat. No. 3,556,932, incorporated herein by reference. These wet-strength agents are made from polymers with molecular weights ranging from less than about 1,000,000, preferably less than about 25,000. The polymers are reacted with glyoxal in a dilute, aqueous solution to impart —CONHCHOHCHO functionalities onto the polymer and to increase the molecular weight of the polymer through glyoxal cross-links. Low molecular weight polymers and dilute solutions are required to impart at least a 6 percent —CONHCHOHCHO functionality to the polymers without infinitely cross-linking, or gelling, them in which condition the polymers are useless for wet-strength applications. Even at these low solids concentrations (dilute conditions), cross-linking continues and limits the shelf life of the product. For example, commercial products, supplied as 10% solids solutions, gel within about 8 days at room temperature.

Another class of water-soluble polymers which suffers from intermolecular cross-linking problems is the epoxide-substituted amine containing wet-strength polymers, such as those disclosed in U.S. Pat. No. 4,233,417 (incorporated herein by reference) and references contained therein. These functionalized polymers are well known to cross-link rapidly by the reaction between the polymer amine and epoxide or chlorohydrin groups, yielding gels which do not perform. To lessen the extent of the problem, several approaches have been taken including diluting the products after manufacture, adjusting the pH to deactivate the epoxide functional groups and reacting the polymeric amines with excess epichlorohydrin to completely quaternize and deactivate all amine groups. These approaches suffer from reduced active solids content of the product, increased processing costs, increased epichlorohydrin requirements and the like.

Other products, produced from various functional group containing materials, discussed more fully hereinbelow, also suffer from the problem of cross-linking and the attendant utility deficiencies and these, also, fall within the scope of products possessing use problems which may be alleviated by this invention.

Accordingly, there exists a need for functionalized water-soluble polymers which can be prepared at high solids levels or at high molecular weight without extensive interpolymer cross-linking such that they may be economically transported and easily handled by the end user without the need for any on site preparation. Such functionalized polymers would satisfy a long felt need and constitute a notable advance in the state of the art.

Surprisingly, it has now been discovered, that functionalized, water-soluble, polymer-based, polymer particles in the form of inverse emulsions or microemulsions can be prepared which polymer particles exhibit performance characteristics superior to those of the prior art as cross-linking occurs. In contrast to prior art methods of production wherein the functionalized polymers contain large quantities of polymer molecules in the same aqueous environment, the functionalized polymers of the present invention are isolated as individual, or a limited number of polymer molecules in each aqueous emulsion micelle. Thus, the problem of large scale interpolymer crosslinking inherent in the solution and inverse emulsion products of the prior art is overcome resulting in polymers which, even though cross-linked, are useful for their intended purpose.

SUMMARY OF THE INVENTION

According to the present invention there is provided water-soluble polymer-based polymer having functional groups capable of cross-linking said polymer, in the form where substantially all of the polymer is present as discrete particles having particle diameters between about 200 and about 4000 Å.

Preferably, the above-identified polymers are produced from an acrylamide; an hydroxyalkyl (alk)acrylate; an N,N-dialkylamino-alkyl(alk) acrylate; or an allyl amine.

Also, according to the present invention are provided processes for the preparation of polymer particles as defined above. In one embodiment, the polymer particles are prepared by:
 (a) admixing
  (i) an aqueous solution of at least one monomer capable of forming a water-soluble polymer and optionally, at least one ethylenically unsaturated comonomer;
  (ii) an oil solution comprising at least one hydrocarbon liquid; and
  (iii) an effective amount of surfactant or surfactant mixture so as to form an inverse emulsion or microemulsion; and
 (b) subjecting the inverse microemulsion obtained in step (a) to polymerization conditions to produce a water-soluble polymer having particle diameters ranging from about 200 to about 4000 Å.
 (c) adding at least one functionalizing agent to the polymerized emulsion obtained in step (b); and
 (d) reacting the functionalizing agent with the water-soluble polymer.

In a second embodiment, the polymer particles are prepared by:
 (a) admixing
  (i) an aqueous solution of (1) at least one monomer capable of forming a water-soluble polymer, (2) at least one functionalizing agent and, optionally, (3) at least one ethylenically unsaturated comonomer;
  (ii) an oil solution comprising at least one hydrocarbon liquid; and
  (iii) an effective amount of a surfactant or surfactant mixture, so as to form an inverse emulsion or microemulsion; and
 (b) subjecting the emulsion obtained in step (a) to polymerization and functionalization conditions to produce an emulsion of a water-soluble polymer-based polymer having particle diameters ranging from about to about 4000 Å.

In a third embodiment, the polymer particles are prepared by:
 a) admixing;
  i) an aqueous solution of at least one monomer capable of forming a water-soluble polymer and containing a functional group and, optionally, at least one ethylenically unsaturated comonomer;
  ii) an oil solution comprising at least one hydrocarbon liquid, and;
  iii) an effective amount of a surfactant or curfactant mixture, so as to form an inverse emulsion or microemulsion, and;
 b) subjecting the emulsion obtained in step a) to polymerization conditions to produce an emulsion of a water-soluble polymer-based polymer having a particle diameter ranging from about 200 to about 4000 Å.

In a fourth embodiment, the polymer particles are prepared by:
 a) admixing;
  i) an aqueous solution of at least one monomer containing a group capable of being transformed into a functional group and capable of forming a water-soluble polymer 1) alone or in conjunction with another monomer or 2) after said group has been transformed into a functional group,
  ii) an oil solution comprising at least one hydrocarbon liquid, and;
  iii) an effective amount of a surfactant or surfactant mixture, so as to form in inverse emulsion or microemulsion, and
 b) subjecting the emulsion obtained in step a) to polymerization and transformation conditions to produce an emulsion of a water-soluble polymer-based polymer having particle diameters ranging from about 200 to about 4000 Å.

Polymerization is carried out by the addition of a polymerization initiator or by subjecting the inverse microemulsion to ultraviolet irradiation.

DETAILED DESCRIPTION OF THE INVENTION

The preparation of functionalized, water-soluble polymers in small aqueous inverse emulsion or microemulsion droplets or micelles eliminates large scale interpolymer cross-linking problems inherent in larger particle inverse emulsion systems and solution product forms thereby allowing the polymer to maintain performance on cross-linking and to be prepared at high polymer solids content.

The present invention comprises water-soluble polymeric particles substituted with at least about 0.5 weight percent of functional groups and having diameters of from about 200 to about 4000 Å.

Water-soluble polymers which may comprise the basis for the polymer particles of the present invention are those which are capable of reacting with a functionalizing agent to impart a functional group thereto or contain such a functional group per se or contain a group capable of being transformed into a function group and exhibit cross-linking during the reaction with the functionalizing agent, during polymerization, during the transformation or upon aging. Examples of suitable water-soluble polymers include those produced from such monomers as the acrylamides such as acrylamide and methacrylamide; N-alkyl acrylamides, such as N-methylacrylamide, N-octylacrylamide; N,N-dialkylaminoalkyl(alk)acrylamides such as N,N-dimethylaminomethyl acrylamide, N,N-dimethylaminopropylmethacrylamide; the hydroxyalkyl(alk)acrylates such as hydroxyethyl acrylate, hydroxyethylmethacrylate; N,N-dialkylaminoalkyl(alk)acrylates such as N,N-dimethylaminoethyl acrylate and methacrylate, N,N-diethylaminoethyl acrylate and methacrylate; unsaturated primary, secondary and tertiary amines such as allyl amine, diallylamine, N-alkyldiallyl amines, mixtures thereof and the like.

These water-soluble polymers may be prepared, via known polymerization procedures, by polymerization of the above-enumerated monomers, alone or in conjunction with up to about 99.5%, by weight, based on the total weight of the polymer, of additional non-ionic, cationic or anionic comonomers such as acryloylmorpholine; N-vinyl pyrrolidone; N-vinylformamide; the N,N-dialkylacrylamides such as N,N-dimethylacrylamide, N,N-dipropylacrylamide; the N,N-dialkylalkacrylamide such as N,N-dimethylmethacrylamide, N,N-dipropylmethacrylamide; diallyldialkyl ammonium chlorides; the salts and quaternaries of N,N-dialkylaminoalkyl(alk)acrylates, N,N-dialkylaminoalkyl(alk)acryamides etc; acrylic acid; methacrylic acid; fumaric acid; itaconic acid; maleic acid; 2-acrylamido-2-methylpropanesulfonic acid; styrene sulfonic acid, their salts, and the like.

Up to about 10%, by weight, same basis, of water-insoluble comonomers may also be included in the base polymers discussed above. Such monomers include styrene; acrylonitrile; methyl acrylate; methyl methacrylate; vinyl acetate; etc.

The functional groups possessed by the polymer particles of the present invention may be imparted thereto by 1) reacting a water-soluble polymer with an agent capable of adding a functional group thereto or 2) polymerizing a monomer capable of forming a water-soluble polymer in the presence of an agent capable of adding a functional group to the resultant polymer, or 3) polymerizing a monomer already possessing a functional group and capable of forming, alone or in conjunction with another monomer, a water-soluble polymer;, or 4) polymerizing a monomer containing a group capable of being transformed into a functional group and capable of forming a water-soluble polymer, 1) alone or in conjunction with another monomer, or 2) after said group has been transformed into a functional group.

In the first instance, a water-soluble polymer is reacted with a material capable of adding a functional group thereto. For example, 1) acrylamide polymers may be reacted with such materials as, aldehydes such as glyoxal, formaldehyde; chlorine, bromine and the like. 2) 2-hydroxyethyl methacrylate polymers may be reacted with such materials as epichlorohydrin; glyoxal; water-soluble diisocyanates; and the like; 3) N,N-dimethylaminoethyl methacrylate polymers may be reacted with such materials as epichlorohydrin; bischloromethyl ether; 1,4-dichlorobutene-2-and the like; 4) diallyl amine polymers may be reacted with epichlorohydrin, bischloromethyl ether; glyoxal; a,a'-dichloroxylene and the like.

As regards the second process discussed above, the above mentioned reactants can be added to the monomers used to prepare the polymer particles before or during the polymerization to add the functional group to the resultant polymer.

In the third process, any of the above described reactions can be carried out on the monomer first and then the resultant functionalized monomer may be polymerized under known conditions.

In the fourth method of preparation, the monomer being polymerized contains, or is made to contain, a group which is capable of being transformed into a functional group. For example, vinyl acetate is copolymerized with N-vinyl pyrrolidone, the acetate groups are hydrolyzed into alcohol groups which are then converted into functional groups by reaction with glyoxal, epichlorohydrin etc. Similarly, vinyl formamide may be polymerized and then hydrolyzed after which it may be reacted as above described as with the allyl amine monomers.

In each of the above procedures, the resultant polymers tend to undergo cross-linking. If the polymers are not produced in accordance with this invention they result in compositions which are not useful for their intended purpose due to the cross-linking which occurs.

As mentioned above, the inverse emulsion or microemulsion polymerization results in polymers having particle diameters ranging from about 200 to about 4000 Å; preferably from about 300 to about 2000 Å and even more preferably from about 350 to about 10000 Å.

The polymer particle of the present invention can be employed as dilute aqueous solutions formed by inverting the emulsions, optionally in the presence of a breaker surfactant, or by recovering the particles from the emulsion such as by stripping or by adding the emulsion to a solvent which precipitates the polymer, e.g. isopropanol, filtering off the resultant solids, drying and redispersing in water.

In addition to those reactions discussed above between monomers, polymers, functionalizing agents etc. the flowing pairs or combinations of functionalities contained on the polymers can result in cross-linked polymers and fall within the scope of those systems contemplated herein:

amines:epoxides
amines:reactive halogens
amines:aldehydes
amines:esters
amines:silanes
amines:isocyanates
amines:acid halides
amines:a,b-unsaturated carbonyl compounds
methylol:amides
methylol:amines
hydroxy:isocyanates
hydroxy:esters
hydroxy:aldehydes
hydroxy:epoxides
hydroxy:reactive halogens
hydroxy:acid halides
hydroxy:silanes
aldehydes:amides
aldehydes:thiols
thiols:reactive halogens
thiols:isocyanates
thiols:acid halides Polymerization in microemulsion and inverse microemulsions is known to those skilled in this art. P. Speiser reported in 1976 and 1977 a process for making spherical "nanoparticles" with diameters less than 800 Å by (1) solubilizing monomers such as acrylamide and methylenebisacrylamide and other materials, such as drugs, in micelles and (2) polymerizing the monomers; see, J. Pharm. Sa., 65 (12), 1763 (1976) and U.S. Pat. No. 4,021,364. Both water-in-oil and oil-in-water systems can be used to prepare these nanoparticles. While not specifically called microemulsion polymerization by the author, this process does contain all the features which are currently used to define microemulsion polymerization. These reports also constitute the first examples of polymerization of acrylamide in a microemulsion. Since then numerous publications reporting polymerization of water-soluble polymers in the inverse phase of microemulsions have appeared. See, for example, U.S. Pat. No. Pat. Nos. 4,521,317; 4,681,912 and GB 216149A, incorporated herein by reference.

In general, microemulsion polymerization processes are conducted by (i) preparing a monomer microemulsion by mixing an aqueous solution of monomers with a hydrocarbon liquid containing an appropriate surfactant or surfactant mixture to form an inverse microemulsion consisting of small aqueous monomer droplets dispersed in the continuous oil phase and (ii) subjecting the monomer microemulsion to free radical polymerization.

In order to obtain an inverse microemulsion, it is generally necessary to use particular conditions whose main parameters are as follows: surfactant concentration, HLB of surfactant or surfactant mixture, temperature, nature of the organic phase and composition of the aqueous phase.

Suitable monomers are anionic, non-ionic and cationic and are as defined above. The aqueous monomer solution may contain such conventional additives as are desired. For example, the solution may contain chelating agents to remove polymerization inhibitors, chain-transfer agents, pH adjusters, initiators and other conventional additives.

Essential to the formation of the microemulsion which may be defined as a transparent and thermodynamically stable emulsion comprising two liquids insoluble in each other and a surfactant, in which the micelles are usually 1000 Å or less in diameter, is the selection of appropriate organic phase and surfactant.

The selection of the organic phase has a substantial effect on the minimum surfactant concentration necessary to obtain the inverse microemulsion and may consist of a hydrocarbon or hydrocarbon mixture. Isoparaffinic hydrocarbons or mixtures thereof are the most desirable in order to obtain inexpensive formulations. Typically the organic phase will comprise mineral oil, toluene, fuel oil, kerosene, odorless mineral spirits, mixtures of any of the foregoing and the like.

The ratio by weight of the amounts of aqueous phase and hydrocarbon phase is chosen as high as possible, so as to obtain, after polymerization, a microemulsion of high polymer content. Practically, this ratio may range, for example, from about 0.5 to about 3:1, and usually approximates 1:1.

The one or more surfactants are selected in order to obtain an HLB (Hydrophilic Lipophilic Balance) value ranging from about 8 to about 12. Outside this range, formation of inverse microemulsions generally cannot be attained. In addition to the appropriate HLB value, the concentration of surfactant must be optimized, i.e., sufficient to form inverse microemulsion. Too low a concentration of surfactant leads to the formation of inverse emulsions and too high a concentration results in increased costs and does not impart any significant benefit. Typical surfactants useful in the practice of this invention may be anionic, cationic or nonionic. Preferred surfactants include sorbitan monooleate, polyoxyethylene (20) sorbitan monooleate, sodium dioctylsulfosuccinate, oleamidopropyldimethylamine, sodium isostearyl-2-lactate and the like.

Polymerization of the microemulsion may be carried out in any manner known to those skilled in the art. Initiation may be effected with a variety of thermal and redox free-radical initiators including peroxides such as t-butyl peroxide; azo compounds such as azobisisobutyronitrile; organic compound such as, potassium persulfate and redox couples such as ferrous ammonium sulfate/ammonium persulfate. Polymerization may also be effected by a photochemical irradiation processes such as ultraviolet irradiation or by ionizing radiation with a cobalt 60 source.

The utility of functionalized polymers is well known, and, as such, the polymer particles, as described herein, are therefore also useful for the same purposes.

DESCRIPTION OF THE PREFERRED EMBODIMENTS

The following examples illustrate the present invention. They are not to be construed to limit the claims in any manner whatsoever.

Bulk Viscosity (BV) of emulsions is measured at $25\pm1°$ in a Brook viscometer (LVT model) with a #2 spindle at 12 rpm.

Standard Viscosity (SV) is measured by adding 50 gms of a 0.2% aqueous polymer solution and 5.84 gms of sodium chloride to 48 gm of water, stirring the resulting mixture for 5 minutes to completely dissolve the salt, adjusting the pH to 5 and determining the viscosity at $25\pm0.1°$ C. using a Brookfiled viscometer (LVT model) with UL adapter at 60 rpm.

Cationic equivalent (CEQ) is measured by the technique described in J. Chem. Ed., 62(7), 627 (1985).

EXAMPLE 1

To a suitable reactor are added 96 gms of an isoparaffinic solvent having a b.p. of 207°–254° C. (IPS), 10.61 gms of polyoxyethylene sorbitan trioleate (POST) and 6.37 gms of the reaction product of diethanolamine and oleic acid (DOA). To the clear solution is added a solution of 28.61 gms of acrylamide (AMD), 5.05 gms of diallyldimethyl ammonium chloride (DADM), 0.017 gms of the disodium salt of ethylenediaminetetracetic acid (EDTA) 0.0034 gms of $NaBrO_3$ and 46.32 gms of deionized water with stirring to produce a clear microemulsion. The solution pH is adjusted to 4.0 with sulfuric acid and the microemulsion is nitrogen sparged to reduce its oxygen content to less than 0.1 ppm. $SO_2$ gas is then passed into the microemulsion to initiate polymerization. The emulsion temperature is held at 25° C. during the polymerization until 96% of the AMD and about 40% of the DADM is converted to polymer. The resultant clear product has a bulk viscosity of 15 cps, a particle size of about 420 Å and a Standard Viscosity of 2.9 cps ($3\times10^6$ M.W.) and a solids content of 17.39% to 50 g of the above microemulsion are added 5.45 gms of a 40% aqueous glyoxal solution at pH 4.0. After standing at room temperature for 17 and 31 days, respectively, 2 portions of the emulsion are inverted by adding them to deionized water and the resultant solutions are added to paper pulp at 0.5% and 1.0% based on the dry fiber. See Table 1 for the paper test results. The acronyms given the various materials in Example 1 apply equally to all the following examples as well as others expressed therein.

TABLE 1

| PAPER TEST | | |
|---|---|---|
| | Example | |
| | 1* | 1 |
| Tensile Strength (lbs./in) | | |
| 0.5%, weight | | |
| 17 days, | 3.1 | 3.5 |
| 31 days, | 2.9 | 3.3 |
| 1.0%, weight | | |
| 17 days, | 4.0 | 4.6 |
| 31 days, | 4.1 | 4.7 |

*control sample; solids content 10%. AMD/DADM/glyoxal commercial product, backbone polymer molecular weight = 10,000.

As can be seen by the wet-strength data, AMD/DADM/glyoxal microemulsion products provide greater wet strength than AMD/DADM/glyoxal wet strength agents described in the prior art as represented by a commercially available sample. The AMD/DADM/glyoxal is also seen to be of higher solids content and prepared with higher molecular weight polymers.

EXAMPLES 2-6

Examples 2-6 describe a series of microemulsion compositions prepared from monomer microemulsions containing AMD/DADM (90/10 by weight), but with varying amounts of glyoxal.

EXAMPLE 2

28.74 gms of POST, 6.74 gms of sorbitan monooleate (SM) and 0.071 gm of benzoin isobutyl ether are dissolved in 191.93 gms of IPS to produce an oil solution. Separately, an aqueous solution of 51.34 gms of AMD, 5.68 gms of DADM, 14.20 gms of glyoxal, 0.028 gm of EDTA and 89.27 gms of water is prepared and adjusted to pH 3.5 with 0.5N HCl. The aqueous monomer solution is then added to the oil solution producing a clear microemulsion as in Example 1. The resulting microemulsion is sparged with nitrogen and polymerization of the monomers thereof is initiated with UV light at 25° C. The polymerization is continued for approximately one half hour and produces a clear, stable microemulsion containing a glyoxalated copolymer of AMD/DADM. The microemulsion possesses a bulk viscosity of 16 cps.

EXAMPLE 3

28.74 gms of POST, 6.74 gms of SM and 0.071 gm of benzoin isobutyl ether are dissolved in 191.93 gms of IPS to product an oil solution. Separately, an aqueous solution of 42.58 gms of AMD, 4.74 gms of DADM, 23.66 gms of glyoxal, 0.028 gm of EDTA and 89.27 gms of water is prepared and adjusted to pH 3.5 with 0.5N HCl. The aqueous monomer solution is then added to the oil solution producing a clear microemulsion as in Example 1. The resulting microemulsion is sparged with nitrogen and polymerization is initiated as in Example 2. The microemulsion of glyoxalated copolymer of AMD/DADM possesses a bulk viscosity of 15 cps.

EXAMPLE 4

31.51 gms of POST, 3.97 gms of SM and 0.071 gm of benzoin isobutyl ether are dissolved in 191.93 gms of IPS to produce an oil solution. Separately, an aqueous solution of 36.5 gms of AMD, 4.06 gms of DADM, 30.42 gms of glyoxal, 0.028 gms of EDTA and 89.27 gms of water is prepared and adjusted to pH 3.5 with 0.5N HCl. The aqueous monomer solution is then added to the oil solution producing a clear microemulsion as in Example 1. Polymerization is conducted as in Example 2 to produce a clear, stable microemulsion containing a glyoxalated copolymer of AMD/DADM having a bulk viscosity of 20.0 cps.

EXAMPLE 5

31.51 gms of POST, 3.97 gms of SM and 0.071 gms of benzoin isobutyl ether are dissolved in 191.93 gms of IPS to produce an oil solution. Separately, an aqueous solution of 31.94 gms of AMD, 3.54 gms of DADM, 35.48 gms of glyoxal, 0.028 gms of EDTA and 89.27 gms of water is prepared and adjusted to pH 3.5 with 0.5N HCl. The aqueous monomer solution is then added to the oil solution producing a clear microemulsion as in Example 1. The resulting microemulsion is sparged with nitrogen. Polymerization is conducted as in Example 2 to produce a clear, stable microemulsion containing a glyoxalated copolymer of AMD/DADM having a bulk viscosity of 5.0 cps.

EXAMPLE 6

31.51 gms of POST, 3.97 gms of SM and 0.071 gm of benzoin isobutyl ether are dissolved in 191.93 gms of IPS to produce an oil solution. Separately, an aqueous solution of 28.4 gms of acrylamide, 3.16 gms of DADM, 39.44 gms of glyoxal, 0.028 gms of EDTA and 89.27 gms of water is prepared and adjusted to pH 3.5 with 0.5N HCl. The aqueous monomer solution is then added to the oil solution producing a clear microemulsion as in Example 1. The resulting microemulsion is sparged with nitrogen and then polymerization is conducted as in Example 2 to produce a clear, stable microemulsion containing a glyoxalated copolymer of AMD/DADM having a bulk viscosity of 17.5 cps.

EXAMPLES 7-9

Examples 7-9 describe a series of compositions prepared from monomer microemulsions possessing varying ratios of AMD/DADM while maintaining a 25%, by weight, glyoxal concentration.

EXAMPLE 7

14.56 g of POST, 3.18 g of SM and 0.0354 g of benzoin isobutyl ether are dissolved in 95.95 g of IPS to produce an oil solution. Separately, an aqueous solution of 22.71 g of AMD, 5.68 g of DADM, 7.10 g of glyoxal, 0.014 g of EDTA and 44.64 g of water is prepared and adjusted to pH 3.5 with 0.5N HCl. The aqueous monomer solution is then added to the oil solution producing a clear microemulsion as in Example 1. The resulting microemulsion is sparged with nitrogen and polymerization is conducted as in Example 2 to produce a clear, stable microemulsion containing a glyoxalated copolymer of AMD/DADM.

EXAMPLE 8

15.36 gms of POST, 2.38 gms of SM and 0.0354 gms of benzoin isobutyl ether are dissolved in 95.95 gms of IPS to produce an oil solution. Separately, an aqueous solution of 19.87 gms of AMD, 8.52 gms of DADM, 7.10 gms of glyoxal, 0.014 gms of EDTA and 44.64 gms of water is prepared and adjusted to pH 3.5 with 0.5N HCl. The aqueous monomer solution is then added to the oil solution producing a clear microemulsion as in Example 1. Polymerization is effected as in Example 2 to produce a clear, stable microemulsion containing a glyoxalated copolymer of AMD/DADM.

EXAMPLE 9

16.94 gms of POST, 0.97 gm of SM and 0.0354 gm of benzoin isobutyl ether are dissolved in 95.95 gms of IPS to produce an oil solution. Separately, an aqueous solution of 14.2 gms of AMD, 14.2 gms of DADM, 7.10 gms of glyoxal, 0.014 gms of EDTA and 44.64 gms of water is prepared and adjusted to pH 3.5 with 0.5N HCl. The aqueous monomer solution is then added to the oil solution producing a clear microemulsion as in Example 1. Polymerization is effected as in Example 2 to produce a clear, stable microemulsion containing a glyoxalated copolymer of AMD/DADM.

EXAMPLE 10

Example 10 is an example of a process utilizing redox initiation and post-addition of glyoxal to the polymerized AMD/DADM microemulsion.

12.85 gms of POST and 3.57 gms of SM are dissolved in 96.0 gms of IPS to produce an oil solution. Separately, an aqueous solution of 28.61 gms of AMD, 5.05 gms of DADM, 0.017 gm of EDTA 0.12 gm of a 2.83 percent solution of sodium bromate and 44.66 g of water is prepared and adjusted to pH 4.0 with 1.0N sulfuric acid. The aqueous monomer solution is then added to the oil solution producing a clear microemulsion as in Example 1. The resulting microemulsion is sparged with nitrogen and $SO_2$ gas is bubbled into the microemulsion initiating polymerization at 25° C. The $SO_2$ bubbling is continued until the polymerization is complete producing a clear, stable microemulsion containing a copolymer of AMD/DADM. To 50 gms of this emulsion is added 5.45 gms of a 40% aqueous glyoxal solution at pH 4. The resulting clear microemulsion contains a glyoxalated copolymer of AMD/DADM.

EXAMPLES 11-14

Examples 11-14 are systems in which a portion of the acrylamide is replaced with another nonionic monomer (N,N-dimethylacrylamide (DMA) or N-vinyl-2-pyrrolidone (VP)).

EXAMPLE 11

12.44 gms of POST, 5.30 gms of SM and 0.0354 gm of benzoin isobutyl ether are dissolved in 95.96 gms of IPS to produce an oil solution. Separately, an aqueous solution of 12.78 gms of AMD 12.78 gms of VP, 2.84 gms of DADM, 7.10 gms of glyoxal, 0.014 gms of EDTA, 1.42 gms of sodium acetate buffer and 43.07 gms of water is prepared at pH 5.5. The aqueous monomer solution is then added to the oil solution producing a clear microemulsion as in Example 1. The resulting microemulsion is polymerized as in Example 2 to produce a clear, stable microemulsion containing a glyoxalated terpolymer of AMD/VP/DADM.

EXAMPLE 12

7.15 gms of POST, 10.59 gms of SM and 0.0354 gms of benzoin isobutyl ether are dissolved in 95.96 gms of IPS to produce an oil solution. Separately, an aqueous solution of 5.68 gms of AMD, 19.88 gms of VP, 2.84 gms of DADM, 7.10 gms of glyoxal, 0.014 gms of EDTA, 1.42 gms of sodium acetate buffer and 43.07 gms of water is prepared at pH 5.5. The aqueous monomer solution is then added to the oil solution producing a clear microemulsion as in Example 1. Polymerization as in Example 2 produces a clear, stable microemulsion containing a glyoxalated terpolymer of AMD/VP-/DADM.

EXAMPLE 13

2.96 gms of polyoxyethylene sorbitan monololeate (POSO), 14.78 gms of polyoxyethylenesorbitol hexaoleate (PESH) and 0.0354 gms of benzoin isobutyl ether are dissolved in 95.46 gms of IPS to produce an oil solution. Separately, an aqueous solution of 2.56 g of AMD, 23.09 gms of DMA, 2.84 gms of DADM, 7.10 gms of glyoxal, 0.014 gm of EDTA, 1.42 gms of sodium acetate buffer and 43.07 gms of water is prepared at pH 5.5. The aqueous monomer solution is then added to the oil solution producing a clear microemulsion as in Example 1. Polymerization, as in Example 2 produces a clear, stable microemulsion containing a glyoxalated terpolymer of AMD/DMA/DADM.

EXAMPLE 14

17.14 gms of PESH, 0.60 gm of SM and 0.0354 gm of benzoin isobutyl ether are dissolved in 95.96 gms of IPS to produce an oil solution. Separately, an aqueous solution of 12.78 gms of AMD, 12.78 gms of DMA, 2.84 gms of DADM, 7.10 gms of glyoxal, 0.014 gms of EDTA, 1.42 gms of sodium acetate buffer and 43.07 gms of water is prepared at pH 5.5. Following Example 2, polymerization results in a clear, stable microemulsion containing a terpolymer of AMD/DMA/DADM.

EXAMPLES 15-22

Examples 15-22 describe the preparation of a series of microemulsion and standard inverse emulsions with varying particle sizes to determine the effect of particle size on wet strength performance. All products are produced from (90/10) AMD/DADM starting monomer (micro)emulsions which are charged with 25%, by weight, of glyoxal based on AMD/DADM.

EXAMPLE 15

8.63 gms of POST, 2.02 gms of SM and 0.0354 gm of benzoin isobutyl ether are dissolved in 95.96 gms of IPS to produce an oil solution. Separately, an aqueous solution of 25.55 gms of AMD, 2.84 gms of DADM, 7.10 gms of glyoxal, 0.014 gm of EDTA, 1.42 gm of sodium acetate buffer and 43.08 gms of water is prepared at pH 5.5. The aqueous monomer solution is then added to the oil solution producing a clear microemulsion as in Example 1. Polymerization as in Example 2 produces a clear, stable microemulsion containing a glyoxalated copolymer of AMD/DADM. The particle size of the polymer is about 630 Å.

EXAMPLE 16

The procedure of Example 15 is again followed except that 28.75 gms of POST and 6.74 gms of SM are used. A glyoxalated copolymer of AMD/DADM with a particle size of about 310 Å is produced.

EXAMPLE 17

Following the procedure of Example 15, except that 11.5 gms of POST and 2.7 gms of SM are used, a glyoxalated copolymer of AMD/DADM having a particle size of about 520 521 .

EXAMPLE 18

Again following the procedure of Example 15 except that 14.37 gms of POST and 3.37 gms of SM are used, a glyoxalated copolymer of AMD/DADM is produced. The particle size of the polymer particles is about 360 Å as produced.

EXAMPLE 19

7.5 gms of DOA and 1.25 gms of an A/B/A block copolymer of about 5000 m.w. wherein the A units comprise palmitic acid and 12-hydroxystearic acid (1:5) and the B units are polyethylene oxide (m.w. 1500) (hereinafter identified as PHP) are dissolved in 70.71 gms of a mixed hydrocarbon solvent having a b.p. range of 370°-518 F. (MH). Separately, an aqueous solution of 59.20 gms of AMD, 6.58 gms of DADM, 16.45 gms of glyoxal, 0.039 gm of EDTA, 3.29 gms of sodium acetate buffer, 0.27 gm of sodium sulfate, 0.0822 gm of 2,2,'-azobis(2-amidinopropane)-dihydrochloride (ABDC) and 99.42 gms of water is prepared and adjusted to pH 5.5 with 0.5N HCl. The aqueous monomer solution is then added to the oil solution and emulsified. The resulting white, inverse emulsion is sparged with nitrogen and then initiated at 25° C. with U.V. light. The polymerization is continued for approximately one hour and produces an inverse emulsion containing a glyoxalated copolymer of AMD/DADM possessing a bulk viscosity of 670 cps. The particle size of the polymer is about 3260 Å.

EXAMPLE 20

(comparative)

3.97 gms of DOA, 0.79 gm of PHP and 0.0822 gm of benzoin isobutyl ether are dissolved in 74.70 gms of PHP and 0.0822 gm of benzoin isobutyl ether are dissolved in 74.70 gms of MH. Following Example 19 except that the ABDC is omitted, an aqueous solution is prepared and adjusted to pH 5.5 with 0.5N HCl. The aqueous monomer solution is then added to the oil solution and emulsified. The resulting white, inverse emulsion is sparged with nitrogen and then initiated with UV light at 25° C. The polymerization is continued for approximately one hour and produces an inverse emulsion containing a glyoxalated copolymer of AMD-/DADM possessing a bulk viscosity of 193 cps. The particle size of the emulsion is about 7820 Å.

EXAMPLE 21

The procedure of Example 19 is again followed except that benzoin isobutyl ether is used in place of the ABDC in equivalent amounts. The resultant polymer has a particle size of 2090 Å.

EXAMPLE 22

15.49 gms of POST and 2.29 gms of SM are dissolved in 95.96 gms of IPS and 0.0354 gm of benzoin isobutyl ether to produce an oil solution. Separately, an aqueous solution of 18.40 gms of AMD, 2.05 gms of DADM, 5.11 gms of glyoxal, 0.012 gm of EDTA, 1.02 gms of sodium acetate and 53.41 gms of water is prepared and adjusted to pH 5.5. The aqueous monomer solution is added to the oil solution producing a clear microemulsion. The resulting emulsion is sparged with nitrogen and initiated with UV light at 25° C. The polymerization is continued for about one half hour and produces a clear, stable microemulsion with a bulk viscosity of 30 cps. The particle size of the glyoxalated AMD/DADM copolymer is 550 Å.

EXAMPLE 23

(Comparative)

52.59 gms of POST and 31.56 gms of DOA are dissolved in 96 gms of IPS to produce an oil solution. Separately, an aqueous solution of 28.61 gms of AMD, 5.05 gms of DADM, 0.017 gm of EDTA, 0.0034 gm of ABDC and 46.32 gms of water is prepared. The aqueous monomer solution is added to the oil solution producing a clear microemulsion. The microemulsion is sparged with nitrogen and then initiated with UV light at 25° C. The polymerization is continued for about 2 hours and produces a clear, stable microemulsion containing a copolymer of AMD/DADM. The bulk viscosity is 213 cps and the polymer particle size is 220 Å.

EXAMPLE 24

71.78 gms of POST, and 16.86 gms of SM and 0.0354 gms of benzoin isobutyl ether are dissolved in 95.96 gms of MH resulting in an oil solution. Separately, an aqueous solution of 25.55 gms of AMD, 2.84 gms of DADM, 7.10 gms of glyoxal, 0.014 gm of EDTA 1.42 gms of sodium acetate, and 43.08 gms of water is prepared and adjusted to pH 5.5 with 0.5N HCl. The aqueous monomer solution is then added to the oil solution producing a clear microemulsion. The microemulsion is then treated as in Example 15 resulting in a glyoxalated copolymer of AMD/DADM possessing a bulk viscosity of 105 cps. The particle size of the polymer is about 300 Å.

EXAMPLE 25-44

In order to determine the ability of the compositions of this invention to impart wet strength to paper, the products prepared in Examples 2-6 (Table 2) (various levels of glyoxal), Examples 7 and 10 (Table 3) (increased levels of DADM), (redox initiation and post addition of glyoxal), Examples 11 and 13 (Table 4) (AMD/VP/DADM and AMD/DMA/DADM terpolymers), and Examples 15-24 and 1 (effect of particle size on performance) (Table 5) were used to make wet strength paper and the resulting properties of the paper examined.

The following describes the method used for making the wet-strength paper. To an aqueous pulp at 0.6% consistency and pH 6.5 composed of bleached Astracell/Albacell hardwood/softwood 50/50, by weight, kraft paper-making fibers beaten to a Canadian standard freeness of about 500 ml is added the cationic resin solution of one of the examples, as a 0.1% solution of broken emulsion, to provide 0.5% of the glyoxalated polymer based on the dry weight of the fibers. The pulp is readjusted to pH 6.5 and is stirred briefly to permit the polymer to be absorbed by the fibers. The fibers are formed into a water-laid web having a basis weight of 50 lbs (25"×40"/500 ream) in a Nash handsheet machine. The web is pressed between blotters and dried for 1 minute in a rotary laboratory drum drier having a drum temperature of 240° F.

The immediate wet strength of the resulting paper is measured after brushing both sides of the paper with water at 20° C. and pH 7. The wet strength results are shown in Tables 2-5 as the performance of the various polymers of the examples specified as a percent of performance of a commercially available 25% glyoxalated polymer of AMD and DADM (90/10).

TABLE 2

| Example | Polymer of Example | Percentage of Commercial Product Immediate Wet Strength Performance | % Glyoxal (a) | AMD/DADM |
|---|---|---|---|---|
| 25 | 2 | 118 | 25 | 90/10 |
| 26 | 3 | 120 | 50 | " |
| 27 | 4 | 124 | 75 | " |
| 28 | 5 | 126 | 100 | " |

TABLE 2-continued

| Example | Polymer of Example | Percentage of Commercial Product Immediate Wet Strength Performance | % Glyoxal (a) | AMD/DADM |
|---|---|---|---|---|
| 29 | 6 | 124 | 125 | " |

(a) percent based on AMD/DADM monomer charge

TABLE 3

| Example | Polymer of Example | Percentage of Commercial Product Immediate Wet Strength Performance | % Glyoxal (a) | AMD/DADM |
|---|---|---|---|---|
| 30 | 7 | 106 | 25 | 80/20 |
| 31 | 10 | 106 | 25 | 85/15 |

TABLE 4

| Example | Polymer of Example | Percentage of Commercial Product Immediate Wet Strength Performance | Paper Strength/Ratio Wet/Dry (%) | % Glyoxal(a) | AMD/DAM/DADM |
|---|---|---|---|---|---|
| 32 | 13 | 103 | 19.1[b] | 25 | AMD/DAM/DADM 9/81/10 |
| 33 | 11 | 111 | 20.1[c] | 25 | AMD/VP/DADM 45/45/10 |

[b] commercial product is 14.3
[c] commercial product is 14.5

TABLE 5

| Example | Polymer of Example | Percentage of Commercial Product Immediate Wet Strength Performance | Particle Size (Å)[d] | Reaction Charge In Aq. Phase % | AMD/DADM/ Glyoxal |
|---|---|---|---|---|---|
| 34 | 15 | 123 | 630 | 44.4 | 90/10/25 |
| 35 | 16 | 118 | 310 | " | " |
| 36 | 17 | 123 | 520 | " | " |
| 37 | 18 | 120 | 360 | " | " |
| 38 | 19 | 81 | 3260 | " | " |
| 39C | 20 | 67 | 7820 | " | " |
| 40 | 21 | 109 | 2090 | " | " |
| 41 | 22 | 132 | 550 | 32.0 | " |
| 42C | 23 | 0 | 220 | 42.1 | 85/15/0 |
| 43 | 24 | 88 | 300 | 44.4 | 90/10/25 |
| 44 | 1 | 113 | 420 | 42.1 | 85/15/25 |

C = Comparative
[d] Transmission Electron Microscopy

The results in Table 2 show that a variety of glyoxal levels can be employed while achieving improved performance of the instant polymers relative to the prior art. Table 3 shows that the benefits of the instant invention are achieved at a variety of AMD/DADM compositions (80/20, by weight, in Example 30, 85/15, by weight, in Example 31 and 90/10, by weight, in Example 25, Table 2). Table 4 shows the invention utilizing terpolymers containing a second nonionic monomer (N,N-dimethylacrylamide and vinyl pyrrolidone) in addition to acrylamide. As can be readily appreciated, these results show that immediate wet strength improvement is maintained while the dry strength is reduced by the increase in the wet/dry ratio. Table 5 shows the effect of particle size on the optimum performance of the product. The compositions of Examples 34-37, 40, 41 and 44 clearly show the improved results in that these compositions show an increase of 9-32% in wet strength performance over the commercially available compositions of the same basic components and concentrations.

EXAMPLE 45

The procedure of Example 1 is followed except that no DADM is added to the monomer mixture. A composition comprising microparticles of a cross-linked glyoxalated acrylamide homopolymer is formed similar to that of Example 1.

EXAMPLES 46-48

The procedure of Example 1 is repeated except that 46) methacryamide, 47) N-methyl acrylamide and 48) N-methyl methacrylamide are substituted for the acrylamide monomer. Compositions comprising microparticles of glyoxalated cationic acrylamide copolymers are formed similar to those of Example 1.

EXAMPLE 49-51

The procedure of Example 1 is followed except that 50) methacryloxyethyltrimethylammonium chloride, 51) methacrylamidopropyltrimethylammonium chloride, and 52) acryloxyethyltrimethyl ammonium chloride are used to replace the DADM. Similar results are achieved.

EXAMPLE 52

Microemulsion Preparation 100 gms of an aqueous solution (pH=3.5) containing 42.3 gms of acrylamide and 0.02 gm of 2-hydroxyethyl ethylenediaminetriacetic acid are pumped at the rate of 4.4 ml/min into 150 gms of an organic solution containing 128.5 gms of an isoparaffinic solvent having a b. p. of 207°–254° C. (IPS), 21.9 gms of polyoxyethylenesorbitol hexaoleate (PESH) and 7.8 gms of sorbitan sesquioleate (SS). A clear, monomer containing microemulsion is obtained.

0.0424 gms of 2,2'-azobis-4-methoxy-2,4-dimethylvaleronitrile in 2 mls of ethyl acetate is added to the monomer containing microemulsion which was previously sparged for 40 minutes using nitrogen. Polymerization is conducted at 30° C. The product is a clear, stable polyacrylamide (PAM) microemulsion (S.V.=3.8 cps).

DMAM Preparation

N,N-dimethyaminomethanol (DMAM) is prepared by slowly adding 7.7 gms of 95 percent paraformaldehyde to a 100 ml flask containing 27.50 gms of a 55 percent aqueous solution of dimethylamine and 6.60 gms of deionized water, keeping the exotherm below 45° C. The resultant DMAM solution is then filtered yielding a clear solution possessing 53.20 gms of DMAM solids.

Mannich PAM Microemulsion Preparation 30.0 gms of the above PAM microemulsion are placed in a suitable reactor. The emulsion is warmed to 30° C. Next 10.0 gms of the DMAM solution prepared above are added to the PAM microemulsion at a rate of 0.08 ml/min. with gentle stirring. The resulting Mannich PAM microemulsion is stored at ambient temperature until use. After 24 hours, the polymer has a CEQ of 5.75 meq/g and S.V. of 2.5 cps.

Free-Drainage Testing

The efficiency of dewatering a typical municipal sludge is determined as follows: 200 gms of sludge are carefully weighed into screw cap jars. Aqueous solutions of Mannich PAM flocculants are prepared by adding the microemulsion (or in the comparative examples, a solution of commercial Mannich PAM) to water so that the polymer concentration is 0.2 weight percent. Various doses of the polymer solutions are added to the sludge samples, water is added to bring the total weight to 250 gms, the mixtures are agitated for 90 seconds, the resulting flocculated sludge is poured into a Buchner funnel containing a filter cloth, and the free drainage is determined by measuring the volume of filtrate collected in 10 seconds. The results are set forth in Table 6, below.

TABLE 6

| MANNICH PAM OF EXAMPLE NO. | DOSE (ml) | FILTRATE (ml) |
|---|---|---|
| 52 | 10 | 100 |
|  | 12.5 | 152 |
|  | 15 | 158 |
|  | 17.5 | 160 |
|  | 20 | 140 |
| 52C | 10 | 60 |
|  | 12.5 | 120 |
|  | 15 | 140 |
|  | 17.5 | 160 |
|  | 20 | 128 |

C = commercially available product

Table 6 clearly shows the superior performance of the Mannich PAM microemulsion of Example 52 as compared to a typical, commercially available, solution Mannich PAM.

EXAMPLES 53–58

Examples 53–58 describe the preparation of PAM microemulsions which are used for the preparation of a series of Mannich PAM microemulsions.

EXAMPLE 53

To 150 gms of an organic solution containing 128.5 g of IPS, 21.9 gms of PESH and 7.8 gms of SS are slowly added 100 gms of a pH 3.5 aqueous solution containing 42.3 g of acrylamide and 0.02 gm of N-(2-hydroxyethyl)ethylenediaminetriacetic acid with stirring. The resulting clear, monomer microemulsion is sparged for 40 minutes with nitrogen. 0.0424 gm of 2,2'-azobis-4-methoxy-2,4 dimethylvaleronitrile in 2 mls of ethyl acetate is then added and the microemulsion polymerized at 30° C. The resulting product is a clear, stable PAM microemulsion having a Standard Viscosity (S.V.) of 3.8 cps and a particle size average of 650 Å (median value as measured by transmission electron microscopy).

EXAMPLE 54

The procedure of Example 53 is again followed and produces a polyacrylamide microemulsion with an S.V. of 3.7 cps.

EXAMPLES 55–57

The procedure of Example 53 is used to prepare the PAM microemulsions of Examples 55–57 with the exception that the amount of emulsifier is altered as shown in Table II, below, to vary the resultant PAM microemulsion particle size.

TABLE 7

| PAM MICRO-EMULSION | PESH-g | SS-g | PARTICLE SIZE (Å)$^a$ | S.V.(cps) |
|---|---|---|---|---|
| Example 55 | 18.72 | 6.66 | 590 | 3.7 |
| Example 56 | 15.60 | 5.55 | 710 | 3.5 |
| Example 57 | 12.48 | 4.44 | 960 | 3.6 |

$^a$as measured by transmission electron microscopy
S.V. = Standard Viscosity

EXAMPLE 58

Example 58 shows the preparation of a PAM microemulsion with a different emulsifier system.

To 145 gms of an organic solution containing 120 gms of IPS, 14.82 gms of PESH and 11.12 gms of the reaction product of diethanolamine and oleic acid (DOA) are slowly added 100 gms of a pH 3.5 aqueous solution containing 42.3 gms of acrylamide and 0.02 gm of N-(2-hydroxyethyl)-ethylenediaminetriacetic acid with stirring. The resulting clear, monomer containing microemulsion is sparged for 40 minutes with nitrogen. 0.0423 gm of 2,2'-azobis-4-methoxy-2,4-dimethylvaleronitrile in 2 mls of ethyl acetate are then added and the microemulsion is polymerized at 30° C. The resulting product is a clear, stable PAM microemulsion having an S.V. of 3.1 cps.

EXAMPLE 59

Example 59 describes the preparation of dimethylamine/formaldehyde (DMA/CHO$_2$O) adducts used to prepare Mannich PAM microemulsions from the PAM microemulsions of Examples 53, 54, 57 and 58.

A. 10.08 gms of 95 percent paraformaldehyde are slowly added to a reaction vessel containing 26.3 gms of a 55 percent aqueous solution of dimethylamine keeping the exotherm below 45° C. The resulting solution is filtered yielding a clear solution B. To 30.0 gms of the solution prepared in Example 8A are added 3.05 gms of 100 percent dimethylamine with mixing, bringing the $DMA/CH_2O$ ratio from 1/1 to 1.25/1.

EXAMPLES 60-66

Examples 60-66 describe the preparation of Mannich PAM microemulsions with differing amounts of dimethylaminomethyl substitution from the PAM microemulsions of Examples 53, 54 and 57 and the $DMA/CH_2O$ adduct from 59B.

30.0 gms of the PAM microemulsion from Example 53 are placed in a reaction vessel at ambient temperature. To this are slowly added 11.0 gms of the $DMA/CH_2O$ adduct from Example 59B, with stirring, yielding a clear, Mannich PAM microemulsion. After approximately 24 hours, the microemulsion is inverted into water resulting in a Mannich PAM with an S.V. of 3.9 cps and a CEQ of 6.2 meq/g. The identical procedure is used to prepare the Mannich PAM microemulsions of Examples 61-66, which differ only in the amount of $DMA/CH_2O$ adduct charged and the PAM microemulsion, as shown in Table 8.

TABLE 8

| EXAMPLE | $DMA/CH_2O$ adduct(g) | PAM MICRO-EMULSION OF EXAMPLE NO. | CEQ(meq/g) | S.V.(cps) |
|---|---|---|---|---|
| 60 | 11.0 | Ex. 53 | 6.2 | 3.9 |
| 61 | 6.6 | Ex. 53 | 3.5 | 4.8 |
| 62 | 4.4 | Ex. 53 | 3.3 | 4.6 |
| 63 | 2.2 | Ex. 53 | — | 4.1 |
| 64 | 1.1 | Ex. 54 | — | 2.7 |
| 65 | 1.5 | Ex. 54 | — | 2.7 |
| 66 | 11.0 | Ex. 54 | — | 4.1 |

EXAMPLE 67

Example 67 is a repeat of Example 59A, with the exception being a slight dilution of the clear solution to reduce the adduct concentration.

22.3 gms of 95 percent paraformaldehyde are slowly added to a vessel containing 57.78 gms of a 55 percent aqueous solution of dimethylamine keeping the exotherm below 45° C. The resulting solution is filtered yielding a clear solution. 12.30 gms of deionized water are then added.

EXAMPLES 68-70

Examples 68-70 describe the preparation of Mannich PAM microemulsions from PAM microemulsions of Examples 53, 57 and 58 and with a $DMA/CH_2O$ (1/1) adduct.

EXAMPLE 68

30.0 gms of the PAM microemulsion from Example 53 are placed in a vessel at ambient temperature. To this are slowly added 10.0 gms of the $DMA/CH_2O$ adduct of Example 16 with stirring, yielding a Mannich PAM microemulsion. After approximately 24 hours, the microemulsion is inverted into water resulting in a Mannich PAM solution with an S.V. of 3.7 cps and a CEQ of 5.6 meq/g. The identical procedure is used to prepare the Mannich PAM microemulsions of Examples 69-70 as shown in Table 9, except different PAM microemulsions are used.

TABLE 9

| EXAMPLE | $DMA/CH_2O$ adduct(g) | PAM MICROEMULSION OF EXAMPLE NO. | CEQ(meq/g) | S.V.(cps) |
|---|---|---|---|---|
| 69 | 10.0 | Ex. 58 | 5.1 | 2.4 |
| 70 | 10.0 | Ex. 57 | 5.4 | 3.3 |

EXAMPLE 71

Example 71 describes the preparation of PAM microemulsion via redox initiation.

To 149.64 gms of an organic solution containing 128.5 gms of IPS, 21.9 gms of PESH and 7.8 gms of SS are slowly added 100 gms of a pH 3.0 aqueous solution containing 42.3 gms of acrylamide, 0.00428 gm of sodium bromate and 0.02 gm of N-(2-hydroxyethyl)-ethylenediaminetriacetic acid with stirring. The resulting clear, monomer microemulsion is sparged for 40 minutes with nitrogen. $SO_2$ gas is then bubbled into the microemulsion while holding the polymerization temperature at 25° C. The resulting product is a clear, stable PAM microemulsion having an S.V. of 2.1 cps. 15 EXAMPLES 72-73

Examples 72 and 73 show the preparation of a morpholine/formaldehyde adduct and the Mannich PAM microemulsion prepared from this adduct.

EXAMPLE 72

10.08 gms of 95 percent paraformaldehyde are slowly added to a reaction vessel containing 27.84 gms of morpholine and 15.45 gms of water keeping the exotherm below 45° C. The resulting solution is filtered yielding a clear solution.

EXAMPLE 73

30.0 gms of the PAM microemulsion from Example 53 are placed in a vessel at ambient temperature. To this are slowly added 11.80 gms of the morpholine/$CH_2O$ adduct of Example 72 with stirring yielding a clear, Mannich PAM microemulsion. After approximately 17 days, the microemulsion is inverted into water giving a Mannich PAM solution with an S.V. of 1.4 cps and a CEQ of 3.1 meq/g. EXAMPLE 74

Example 74 shows the preparation of a Mannich PAM microemulsion where formaldehyde and diethylamine are charged sequentially into the PAM microemulsion.

30.0 gms of the PAM microemulsion of Example 54 are placed in a vessel at ambient temperature. To this are slowly added 2.85 gms of 37.2 percent aqueous formaldehyde with stirring. Next, 2.56 gms of diethylamine are slowly added to the microemulsion with stirring, yielding a slightly hazy, Mannich PAM microemulsion. After 24 hours, the microemulsion is inverted into water giving a Mannich PAM solution having an S.V. of 3.58 cps and a CEQ of 3.0 meq/g.

EXAMPLES 75–76

Examples 75 and 76 show the preparation of a diethylamine/dimethylamine/formaldehyde (0.5/0.5/1) adduct and the Mannich PAM microemulsion prepared from this adduct.

EXAMPLE 75

10.08 gms of 95 percent paraformaldehyde are slowly added to a reaction vessel containing 12.83 gms of a 56 percent aqueous solution of dimethylamine, 11.67 gms of diethylamine and 8.32 gms of water, keeping the exotherm below 45° C. The resulting solution separates into two layers. The bottom layer, which weighs 32.6 gms is shown by NMR to be the desired diethylamine/dimethylamine/formaldehyde (0.5/0.5/1) adduct. This layer is collected and used in Example 76 to prepare a Mannich PAM microemulsion.

EXAMPLE 76

30.0 gms of the PAM microemulsion of Example 54 are placed in a vessel at ambient temperature. To this is slowly added the diethylamine/dimethylamine/formaldehyde adduct of Example 75 with stirring to yield a clear, Mannich PAM microemulsion. After approximately 24 hours, the microemulsion is inverted into water giving a Mannich PAM with an S.V. of 2.8 cps and a CEQ of 4.04 meq/g.

EXAMPLES 77–82

Examples 77–79 describe the preparation of PAM copolymer microemulsions using acrylic acid (AA), 2-acrylamido-2-methylpropanesulfonic acid (AMMPS), and diallyl dimethylammonium chloride (DADM), respectively, as the comonomers with acrylamide. Examples 80–82 describe the preparation of Mannich PAM microemulsions from these systems.

EXAMPLE 77

To 299.3 gms of an organic solution containing 240 gms of IPS, 43.78 gms of PESH and 15.5 gms of SS are slowly added 200 gms of a pH 3.15 aqueous solution containing 80.38 gms of acrylamide, 4.29 gms of acrylic acid and 0.028 gms of N-(2-hydroxyethyl)-ethylenediaminetriacetic acid with stirring. The resulting clear monomer microemulsion is sparged for 40 minutes with nitrogen. 0.0424 gm of 2,2'azobis-4-methoxy-2,4-dimethylvaleronitrile, in 2 mls of ethyl acetate, are then added and the microemulsion is polymerized at 30° C. The resulting product is a clear, stable acrylamide-acrylic acid copolymer microemulsion with an S.V. of 3.48 cps.

EXAMPLE 78

To 150 gms of an organic solution containing 120.0 gms of IPS, 15.0 gms of PESH and 15.0 gms of SS are slowly added 100 gms of a pH 8.5 aqueous solution containing 31.22 gms of acrylamide, 11.18 gms of AMMPS and 0.02 gm of N-(2-hydroxyethyl)-ethylenediaminetriacetic acid with stirring. The resulting monomer microemulsion is sparged for 40 minutes with nitrogen. 1.0 gm of a 4.24 percent solution of 2,2'azobis(2,4-di-methylpentane) nitrile in ethyl acetate are then added and the microemulsion is polymerized at 50° C. The resulting product is a clear, stable, acrylamide-AMMPS copolymer microemulsion with an S.V. of 3.0 cps.

EXAMPLE 79

To 137.1 gms of an organic solution containing 120 gms of decane, 14.20 gms of PESH and 2.90 gms of polyoxyethylene sorbitan monooleate (POSO) are slowly added 106.97 gms of an aqueous solution containing 17.23 gms of acrylamide, 25.92 gms of DADM and 0.02 gm of N-(2-hydroxyethyl)-ethylenediaminetriacetic acid with stirring. The resulting clear, monomer microemulsion is sparged for 40 minutes with nitrogen. 0.0424 gm of 2,2'-azobis-4methoxy-2,4-dimethylvaleronitrile in 0.8 gm of ethyl acetate is then added and the microemulsion is polymerized at 30° C. The resulting product is a clear, stable acrylamide-DADM copolymer microemulsion with an S.V. of 2.3 cps.

EXAMPLE 80

30.0 gms of the acrylamide/acrylic acid copolymer microemulsion of Example 77 are placed in a vessel at ambient temperature. To this are slowly added a solution of 9.50 gms of the DMA/CH$_2$O adduct of Example 67 and 0.36 gm of dimethylamine with stirring yielding a Mannich acrylamide-acrylic acid copolymer microemulsion. After approximately 24 hours, the microemulsion is inverted into water giving a Mannich copolymer with an S.V. of 4.1 cps and a CEQ of 6.33 meq/g.

EXAMPLE 81

30.0 gms of the acrylamide/AMMPS copolymer microemulsion of Example 79 are placed in a vessel at ambient temperature. To this are slowly added 7.06 gms of a solution of the DMA/CH$_2$O adduct of Example 67 and 0.645 gm of dimethylamine with stirring yielding a Mannich acrylamide-AMMPS copolymer with an S.V. of 1.7 cps and a CEQ of 4.1 meq/g.

EXAMPLE 82

30.0 gms of the acrylamide/DADM copolymer microemulsion of Example 79 are placed in a vessel at ambient temperature. To this are slowly added 4.06 gms of a solution of the DMA/CH$_2$O adduct of Example 67 and 0.41 gm of dimethylamine with stirring yielding a Mannich acrylamide-DADM copolymer microemulsion. After approximately 24 hours, the microemulsion is inverted into water giving a Mannich copolymer with an S.V. of 2.3 cps and a CEQ of 6.70 meq/g.

EXAMPLES 83–94

Examples 83–86 describe the preparation of inverse emulsion PAMS with particle sizes of 3600 Å; 6600 Å; 11,400 Å and 20,500 Å which are then converted to Mannich PAM inverse emulsions by reacting them with DMA/CH$_2$O (1.25/1 and 1/1) adducts in Examples 87–90 and 91–94, respectively. The products of Examples 68, 70 and 91–94 are then used to determine the effect of particle size on flocculation performance.

EXAMPLES 83–86

The general procedure used to prepare the inverse emulsion PAMS is as follows: DOA and an A/B/A block copolymer of about 5000 m.w. wherein the A units comprise palmitic acid and 12-hydroxystearic acid (1:5) and the B units are polyethyleneoxide (m.w. 1500), hereinafter PHP, are dissolved in low odor paraffin solvent (OPS) to produce an oil solution. An aqueous monomer solution is prepared by dissolving a 52 percent aqueous solution of acrylamide, the disodium salt of ethylenediaminetetraacetic acid (EDTA-2Na) 2,2'-azobis-(2-amidinopropane) hydrochloride and $Na_2SO_4$ in water, and then adjusting the pH to 3.0–3.5 with 10 percent sulfuric acid. The aqueous monomer solution is then added to the oil solution and emulsified. The resulting inverse emulsion is sparged with nitrogen and then initiated with UV light at 25° C. The polymerization is continued for approximately 3.5 hours. The particle size average is a median value as measured by a Horiba particle size analyzer. The composition of the inverse emulsions and the resulting polymer characteristics are shown below in Table 10.

TABLE 10

|  | Example 83 | Example 84(C) | Example 85(C) | Example 86(C) |
|---|---|---|---|---|
| OIL PHASE | | | | |
| OPS | 70.8 | 70.8 | 70.8 | 70.8 |
| DOA | 7.5 | 7.5 | 7.5 | 7.5 |
| PHP | 1.25 | 1.25 | 1.25 | 1.25 |
| Acrylamide (52%) | 86.6 | 86.6 | 86.6 | 86.6 |
| EDTA.2Na (10%) | 0.23 | 0.23 | 0.23 | 0.23 |
| $Na_2SO_4$ (1.93%) | 3.58 | 3.58 | 3.58 | 3.58 |
| AQUEOUS PHASE | | | | |
| Azo Cat. (2%) | 0.45 | 1.13 | 2.25 | 2.25 |
| Water | 94.5 | 93.8 | 92.7 | 92.7 |
| POLYMER | | | | |
| Conversion, % | 97.4 | 96.0 | 97.8 | 98.5 |
| S.V., cps | 3.7 | 3.6 | 3.1 | 3.8 |
| Particle size, Å | 3,600 | 6,600 | 11,400 | 20,500 |

*all components are given in grams
S.V. = standard viscosity
C = comparative

EXAMPLES 87–94

The following is a general description of the method used to prepare the Mannich PAM inverse emulsions of Examples 87–94. 30.0 gms of PAM inverse emulsion from the previous designated example is placed in a vessel at ambient temperature. To this is slowly added a solution of $DMA/CH_2O$ adduct with stirring yielding a stable Mannich PAM inverse emulsion. After several days, the Mannich PAM inverse emulsion is inverted into water giving a Mannich PAM and the S.V. and the CEQ are determined. The compositions of the examples and the resulting characteristics are shown in Tables 11 and 13, below.

TABLE 11

| Example | Inverse Emul. of Ex. No. | $DMA/CH_2O$ RATIO | wt. $DMA/CH_2O$(g) | Polymer SV (cps) | Polymer CEQ (meq/g) |
|---|---|---|---|---|---|
| 87 | 83 | 1.25 | 11.0 | 3.9 (3 days) | 5.7 |
| 88 | 84 | 1.25 | 11.0 | 3.8 (3 days) | 6.0 |
| 89 | 85 | 1.25 | .11.0 | 3.7 (3 days) | 6.3 |
| 90 | 86 | 1.25 | 11.0 | 3.9 (3 days) | 5.8 |
| 91 | 83 | 1.0 | 10.0 | 3.9 (2 days) | 5.2 |
| 92 | 84 | 1.0 | 10.0 | 3.8 (2 days) | 4.9 |
| 93 | 85 | 1.0 | 10.0 | 3.2 (2 days) | 5.5 |
| 94 | 86 | 1.0 | 10.0 | 3.9 (2 days) | 5.3 |

EXAMPLE 95

The performance of the Mannich PAM microemulsion of Example 60 is determined by free-drainage sludge dewatering tests as follows: 200 gms of sewage sludge from the Stamford, Conn. waste treatment plant is carefully weighed into screw cap jars. Aqueous solutions of Mannich PAM flocculant are prepared so that the concentration of polymer is 0.2%. Various doses of the solutions are added to the sludge samples, water is added to bring the total weight to 250 gms, the sludge is agitated for 90 seconds, the resulting flocculated sludge is poured into a Buchner funnel containing a filter cloth, and the free drainage is determined by measuring the volume of filtrate collected in 10 seconds. The improved performance of Mannich PAM microemulsion from Example 9 (10 days old) compared to a commercially available Mannich PAM is clearly seen in Table 12.

TABLE 12

| Mannich PAM of Example No. | Dose (ml) | Filtrate (ml) |
|---|---|---|
| 60 | 9.5 | 70 |
|  | 10.5 | 108 |
|  | 11.0 | 135 |
|  | 12.5 | 125 |
|  | 13.0 | 125 |
|  | 15.0 | 105 |
| 60C | 11.5 | 65 |
|  | 12.5 | 85 |
|  | 13.0 | 85 |
|  | 15.0 | 98 |
|  | 16.5 | 120 |
|  | 17.5 | 125 |
|  | 20.0 | 120 |

C = commercially available product

EXAMPLE 96

The significance of particle size on performance is determined by free-drainage testing of the aged (72 day old) microemulsions and inverse emulsions as shown in Table 13, below. The test results clearly show the increase in flocculant dose required as the particle size increases.

TABLE 13

| Emulsion of Example No. | Micelle Size (Å) | Aged Polymer SV (cps) | Aged Polymer CEQ (meq/g) |
|---|---|---|---|
| 68 | 650 | 1.2 | 5.5 |
| 70 | 960 | 1.1 | 5.4 |
| 91 | 3,600 | 1.2 | <0.2 |
| 92 | 6,600 | 1.1 | <0.2 |
| 93 | 11,400 | 1.1 | <0.2 |
| 94 | 20,500 | 1.1 | <0.2 |

| | Dose (ml) | Filtrate (ml) |
|---|---|---|
| 68 | 15 | 120 |
| | 17.5 | 160 |
| | 20 | 165 |
| | 22.5 | 160 |
| 70 | 15 | 90 |
| | 17.5 | 145 |
| | 20 | 170 |
| | 22.5 | 180 |
| 91 | 20 | 100 |
| | 22.5 | 135 |
| | 25 | 180 |
| | 30 | 180 |
| 92C | 20 | 55 |
| | 30 | 100 |
| | 35 | 165 |
| | 37.5 | 180 |
| | 40 | 185 |
| 93C | 30 | 128 |
| | 32.5 | 148 |
| | 35 | 175 |
| | 40 | 185 |
| 94C | 30 | 98 |
| | 40 | 130 |
| | 50 | 175 |

C = comparative

EXAMPLE 97

The procedure of Example 52 is again followed except that the Mannich PAM microemulsion is subjected to treatment with dimethyl sulfate to quaternize the Mannich PAM. A quaternized polymer is recovered.

EXAMPLE 98

60.0 gms of PESH, 18.6 gms of SS and 360 gms of IPS are stirred together to form an oil solution. Separately, 15.6 gms of N,N-dimethylaminopropylacrylamide are slowly added to 10 percent, by weight, of aqueous nitric acid at 25° C. 9.25 gms of epichlorohydrin are added in one portion to the monomer solution. 0.05 gm of benzyl trimethylammonium chloride is added and the mixture is heated with stirring to 50° C. for 3 hours. The mixture is cooled to 25° C. and extracted with IPS. The extracted aqueous solution is then added to 94.80 gms of water and 63.95 gms of AMD. The combined comonomer solution is added to the oil solution producing a clear microemulsion. 0.124 gms of 2,2'-azobis-(4-methoxy-2,4-dimethyl valeronitrile) catalyst in 4.0 gms of ethyl acetate is prepared separately and sparged with nitrogen. The microemulsion is sparged with nitrogen and polymerization is initiated by addition of the catalyst and by heating the mixture to 30° C. The microemulsion of the resultant epoxidized AMD/N,N-dimethylaminopropylacrylamide copolymer possesses a bulk viscosity of 47 cps.

This microemulsion copolymer, after one (1) day, has a standard viscosity of 1.8 cps and is then tested for dry/wet strength performance as in examples 25–44 by wet end addition at pH 6.5. The results, at a dosages of 0.5% on dry fiber, show a dry strength of 20.06 lbs/in and a wet strength of 3.32 lbs/in.

As can be seen, the polymer imparts satisfactory wet/dry strength to paper.

EXAMPLE 99

13.72 gms of POST and 4.22 gms of SM are dissolved in 96.00 gms of IPS and 0.0354 gm of benzoin isobutyl ether to form an oil solution. Separately, an aqueous solution of 31.93 gms of AMD, 3.55 gms of DADM, 0.0710 gm of methylenebisacrylamide (MBA), 0.018 gm of EDTA, and 44.43 gms of water is prepared and adjusted to pH 5.5. The aqueous monomer solution is added to the oil solution producing a clear microemulsion. The resulting emulsion is sparged with nitrogen and initiated with UV light at 25° C. The polymerization is continued for about one half hour to produce a clear, stable microemulsion with a bulk viscosity of about 20 cps and a 2000 ppm Solution Viscosity of 1.5 cps.

The microemulsion is tested for wet/dry strength performance as in Example 98. The resultant wet strength is 0.8 lbs/in. and the dry strength is 18.7 lbs/in.

50 grams of the microemulsion, with stirring, are purged with chlorine gas to result in a 0.1% active chlorine content, based on the active charge in the microemulsion, as determined by sodium thiosulfate titration.

When the four (4) day old microemulsion of the chlorinated polymer, having a Solution Viscosity of 1.01, is tested for wet/dry strength performance as above, the dry strength is 21.4 at pH 6.0 and 21.8 at pH 8.0 while the wet strength is 2.3 at pH 6.0 and 2.2 at pH 8.0, thus indicating that even though cross-linked as evidenced by the viscosity reduction, the polymer still performed satisfactorily.

EXAMPLE 100

To 246.05 grams of an organic solution containing IPS (199.7 gms), PESH (31.6 gms) and SS (13.9 gms) are slowly added 242.5 gms of a pH 3.0 aqueous solution containing acrylamide (109.8 gms) sodium bromate (0.0055 g) and N-(2-hydroxyethyl)-ethylenediaminetriacetic acid (0.10 g) with stirring. The resulting, slightly cloudy, monomer microemulsion is sparged for 40 minutes with nitrogen. $SO_2$ gas is then bubbled into the resultant microemulsion and the polymerization temperature kept at 55° C. The $SO_2$ gas is prepared by passing nitrogen gas through a 0.5% sodium metabisulfite solution. The resulting product is a clear, stable, polyacrylamide microemulsion having an S.V. of 2.7 cps.

EXAMPLE 101

A. Paraformaldehyde (92.4 gms, 95%) is slowly added to a suitable vessel containing a dimethylamine (218.4 gms, 60.4% aqueous solution) while keeping the exotherm below 45° C. The resulting solution is allowed to cool with stirring and is then filtered yielding a clear solution.

B. To 70.0 gms of the product of Example 101A are added 17.13 gms of deionized water.

C. To 190.0 gms of the product of Example 101A are added 15.04 gms of dicyanadiamide, 18.62 gms of sodium bisulfite, and 12.86 gms deionized water. The solution is filtered yielding a clear solution.

EXAMPLE 102

150 gms of the PAM microemulsion of Example 100 are placed in a reaction vessel at ambient temperature.

To this are slowly added 62.7 gms of the DMA/CH$_2$O adduct from Example 101B, with stirring, yielding a hazy, Mannich PAM microemulsion. After approximately 24 hours, the microemulsion is inverted into water giving a Mannich PAM with an S.V. of 2.65 cps and a CEQ of 6.6 meg/g.

EXAMPLE 103

150 gms of the PAM microemulsion of Example 100 are placed in a reaction vessel at ambient temperature. To this are slowly added 62.7 gms of the DMA/CH$_2$O adduct from Example 101C, with stirring, yielding a clear, Mannich PAM microemulsion. After approximatley 24 hours, the microemulsion is inverted into water giving a Mannich PAM with an S.V. of 2.65 cps and a CEQ of 6.2 meg/g.

EXAMPLE 104

75 gms of the Mannich PAM microemulsion of Example 103 are placed in a pressure reactor mounted on a shaker. To this are added 8.5 gms of methylchloride at ambient temperature over a period of approximately 2 hours, keeping the pressure of the reactor under 30 psi. The resulting product is a clear, stable, quaternized Mannich PAM having an S.V. of 2.1 cps.

EXAMPLE 105

50 gms of the Mannich PAM microemulsion of Example 103 are placed in a pressure reactor mounted on a shaker. To this are added 4.5 gms of methylchloride at ambient temperature over a period of approximately 2 hours, keeping the pressure of the reactor under 30 psi. The resulting product is a clear, stable, quaternized Mannich PAM having an S.V. of 2.2 cps.

EXAMPLE 106

50 gms of the Mannich PAM microemulsion of Example 103 are placed in a pressure reactor mounted on a shaker. To this are added 2.9 gms of methylchloride at ambient temperature over a period of approximately 2 hours, keeping the pressure of the reactor under 30 psi. The resulting product is a clear, stable, quaternized Mannich PAM having an S.V. of 2.4 cps.

EXAMPLE 107

50 gms of the Mannich PAM microemulsion of Example 102 are placed in a pressure reactor mounted on a shaker. To this are added 6.0 gms of methylchloride at ambient temperature over a period of approximately 2 hours, keeping the pressure of the reactor under 30 psi. The resulting product is a clear, stable, quaternized Mannich PAM having an S.V. of 1.8 cps.

EXAMPLE 108

150 gms of the PAM microemulsion of Example 100 are placed in a reaction vessel at ambient temperature. To this are slowly added 25.1 gms of the DMA/CH$_2$O adduct from Example 101C, with stirring, yielding a hazy, Mannich PAM microemulsion. After approximately 24 hours, the microemulsion is inverted into water giving a Mannich PAM with an S.V. of 2.65 cps.

EXAMPLE 109

50 gms of the Mannich PAM microemulsion of Example 108 are placed in a pressure reactor mounted on a shaker. To this are added 2.7 gms of methylchloride at ambient temperature over a period of approximately 2 hours, keeping the pressure of the reactor under 30 psi. The resulting product is a clear, stable, quaternized Mannich PAM having an S.V. of 1.4 cps.

EXAMPLE 110

The performance of the quaternized Mannich PAMs of Examples 104-107 and 109 is determined by free drainage sludge dewatering tests as follows: 200 gms of sewage sludge from a municipal waste treatment plant are carefully weighed into jars. Aqueous solutions of the quaternized Mannich PAM flocculant are prepared so that the concentration of polymer is 0.2%. Various doses of the resultant solutions are added to the sludge samples, the sludge agitated for 5 seconds at 300 rpm with an overhead mixer, the resulting flocculated sludge poured into a Buchner funnel containing a filter cloth and the free drainage determined by measuring the milliliters of filtrate collected in 10 seconds. The efficacy of the quaternized polymers (QP) as flocculants is clearly seen in Table 14, below, where they are compared to a commercially available cationic flocculant with similar charge.

TABLE 14

| QP of Example | Dosage (lbs/ton) | Filtrate Vol. (ml.) |
|---|---|---|
| 104 | 3.72 | 140 |
|  | 5.58 | 155 |
|  | 7.44 | 155 |
|  | 9.30 | 160 |
| 105 | 3.72 | 140 |
|  | 5.58 | 155 |
|  | 7.44 | 155 |
|  | 9.30 | 160 |
| 106 | 3.72 | 145 |
|  | 5.58 | 155 |
|  | 7.44 | 170 |
|  | 9.30 | 165 |
| 107 | 3.72 | 130 |
|  | 5.58 | 155 |
|  | 7.44 | 165 |
|  | 9.30 | 170 |
| 109 | 3.72 | 48 |
|  | 5.58 | 50 |
|  | 7.44 | 60 |
|  | 9.30 | 95 |
|  | 11.16 | 110 |
|  | 13.02 | 115 |
|  | 14.88 | 120 |
|  | 16.74 | 128 |
| Comm. | 1.86 | 125 |
|  | 3.72 | 140 |
|  | 5.88 | 148 |
|  | 7.44 | 148 |

Comm. = Commercially available copolymer of acrylamide and acryloxyethyltrimethylammonium chloride (45/55).

Following the testing procedure set forth above, (Example 110) except where modified as indicated, other quaternary polymers falling within the scope of the instant invention are tested as flocculants. The results are set forth in Table 15, below.

TABLE 15

| QP of Example | Dosage (lbs/ton) | Filtrate Vol. (ml.) | Cake Solids |
|---|---|---|---|
| Sludge #2 | | | |
| 97 (S.V. = 1.2)[1] | 25.0 | 140 | 21.2 |
|  | 27.5 | 148 | 21.0 |
|  | 30.0 | 142 | 21.5 |
|  | 32.5 | 136 | 21.1 |
| Comm.[1] | 22.5 | 114 | 19.7 |
|  | 25.0 | 142 | 19.9 |
|  | 27.5 | 134 | 20.6 |
|  | 30.0 | 142 | 18.6 |
| Sludge #3 | | | |
| 97 (S.V. = 2.0)[2] | 40.0 | 130 | 10.5 |

TABLE 15-continued

| | | | |
|---|---|---|---|
| | 48.0 | 126 | 10.5 |
| | 56.0 | 128 | 10.7 |
| 97 (S.V. = 1.2)[2] | 40.0 | 131 | 10.2 |
| | 48.0 | 134 | 10.8 |
| | 56.0 | 134 | 11.4 |
| Comm.[2] | 24.0 | 125 | 9.1 |
| | 32.0 | 120 | 8.3 |
| | 40.0 | 108 | 8.8 |
| Sludge #4 | | | |
| 97 (S.V. = 1.45) | 1.4 | 14 | ** |
| | 2.7 | 33 | 37.1 |
| | 4.1 | 65 | 41.4 |
| | 5.4 | 80 | 42.0 |
| | 6.8 | 90 | 41.3 |
| Comm. | 1.4 | 22 | ** |
| | 2.7 | 58 | 39.5 |
| | 4.1 | 45 | 32.9 |
| | 5.4 | 37 | 30.2 |
| Sludge #5 | | | |
| 97 (S.V. = 2.0)[3] | 8.23 | 160 | 14.8 |
| | 12.35 | 205 | 15.3 |
| | 16.46 | 220 | 15.8 |
| | 20.58 | 230 | 16.3 |
| | 24.69 | 230 | 16.9 |
| 97 (S.V. = 2.4)[3] | 8.23 | 130 | 14.2 |
| | 12.35 | 210 | 15.3 |
| | 16.46 | 220 | 16.0 |
| | 20.58 | 235 | 16.5 |
| | 24.69 | 236 | 16.7 |
| Comm.[3] | 8.23 | 160 | 14.1 |
| | 10.29 | 200 | 14.7 |
| | 12.35 | 208 | 15.0 |
| | 16.46 | 226 | 15.1 |
| | 20.58 | 214 | 14.7 |
| Sludge #6 | | | |
| 104 (S.V. = 2.4) | 6.3 | 134 | 22.5 |
| | 8.4 | 158 | 24.4 |
| | 10.5 | 152 | 23.4 |
| | 12.6 | 160 | 24.5 |
| Comm.*** | 4.2 | 146 | 21.2 |
| | 5.3 | 143 | 21.2 |
| | 6.3 | 145 | 21.5 |
| | 8.4 | 138 | 21.1 |

| | Shear | Dosage | Filtrate | Cake |
|---|---|---|---|---|
| Sludge #7 | | | | |
| 97 (S.V. = 2.5) | 300 rpm/5 min | 10 | 70 | 13.1 |
| | 300 rpm/10 min | 10 | 85 | 13.3 |
| | 300 rpm/5 min | 11.7 | 98 | 14.0 |
| | 300 rpm/10 min | 11.7 | 88 | 13.3 |
| | 300 rpm/10 min | 13.3 | 95 | 14.0 |
| | 300 rpm/10 min | 15.0 | 100 | 14.6 |
| Comm. | 300 rpm/8 min | 6.7 | 82 | 12.8 |
| | 300 rpm/15 min | 6.7 | 70 | 13.0 |
| | 300 rpm/5 min | 8.3 | 70 | 12.3 |
| | 300 rpm/10 min | 8.3 | 85 | 13.0 |
| | 300 rpm/15 min | 8.3 | 82 | 13.9 |
| | 300 rpm/15 min | 10.0 | 95 | 13.8 |
| | 300 rpm/15 min | 11.7 | 92 | 12.6 |
| | 300 rpm/30 min | 11.7 | 89 | 14.1 |

[1] 10 sec. at 300 rpm agitation
[2] mixer set at 5½ for 10 sec. and 2½ for 20 sec.
** not measurable
[3] 350 rpm/20 sec. agitation
*** 300 rpm/15 sec. agitation The above mentioned patents and publications are incorporated herein by reference.

Many variations of the present invention will suggest themselves to those skilled in this art in light of the above detailed description. For example, instead of employing acrylamide as the (alk)acrylamide monomer; methacrylamide and ethacrylamide may be used. Polymerization may be initiated by any known method such as ionizing radiation in addition to ultraviolet or redox initiation. A wide variety of secondary amines are suitable for use in the Mannich reaction such as piperidine, diethanolamine, dibutylamine and amylmethylamine; as are a wide variety of formaldehydes, including trioxane.

All such obvious modification are within the full intended scope of the appended claims.

Although the above discussion is directed primarily to the use of (meth)acrylamide-based polymers which, before functionalization, are substantially linear, it is also possible to use lightly to moderately cross-linked (meth)acrylamide-based polymers which can be prepared by adding small amounts of cross-linking monomers such as methylenebisacrylamide etc. to the aqueous acrylamide monomer solutions of either of the processes described above prior to polymerization.

We claim:

1. A process for the preparation of a water-soluble polymer-based polymer having functional groups which continually self cross-link said polymer at ambient conditions said polymer being in a form where substantially all of the polymer is present as discrete particles having diameters of between about 200 and about 4000 Å which comprises:
   a) admixing etc.
      i) an aqueous solution of at least one monomer capable of forming a water-soluble polymer and, optionally, at least one ethylenically unsaturated comonomer;
      ii) an oil solution comprising at least one hydrocarbon liquid; and
      iii) an effective amount of a surfactant or surfactant mixture so as to form an inverse emulsion or microemulsion;
   b) subjecting the emulsion obtained in step (a) to polymerization conditions to produce an emulsion of a water-soluble polymer particle diameters ranging from about 200 to about 4000 Å;
   c) adding at least one functionalizing agent, to the polymerized emulsion obtained in step (b); and
   d) reacting with the agent the water-soluble polymer.

2. A process for the preparation of a water-soluble polymer-based polymer having functional groups which continually self cross-link said polymer at ambient conditions said polymer being in the form where substantially all of the polymer is present as discrete particles having diameters of between about 200 and about 4000 Å which comprises:
   (a) admixing
      (i) an aqueous solution of (1) at least one monomer capable of forming a water-soluble polymer, and (2) at least one functionalizing agent and, optionally, (3) at least one ethylenically unsaturated comonomer;
      (ii) an oil solution comprising at least one hydrocarbon liquid; and
      (iii) an effective amount of a surfactant or surfactant mixture, so as to form an inverse emulsion or microemulsion; and
   (b) subjecting the emulsion obtained in step (a) to polymerization and functionalization conditions to produce an emulsion of a water-soluble polymer-based polymer having particle diameters from about 200 to about 4000 Å.

3. A process as defined in claim 1 including the step of (e) inverting the functionalized polymeric material microemulsion.

4. A process as defined in claim 2 including the step of (c) inverting the functionalized polymeric material microemulsion.

5. A process as defined in claim 1 wherein said monomer comprises an acrylamide; an hydroxy alkyl(alk)acrylate; an N,N-dialkylaminoalkyl(alk)acrylate or an allyl amine.

6. A process as defined in claim 1 wherein said monomer comprises acrylamide.

7. A process as defined in claim 2 wherein said monomer comprises acrylamide.

8. A process as defined in claim 2 wherein said monomer comprises an acrylamide, an hydroxyalkyl(alk)acrylate; an N,N-dialkylaminoalkyl(alk)acrylate or an allyl amine.

9. A process for the preparation of a water-soluble polymer-based polymer having functional groups which continually self cross-link said polymer at ambient conditions said polymer being in a form where substantially all of the polymer is present as discrete particles having diameters of between about 200 and about 4000 Å which comprises:
  (a) admixing
    (i) an aqueous solution of at least one monomer capable of forming a water-soluble polymer and containing a functional group and, optionally, at least one ethylenically unsaturated comonomer;
    (ii) an oil solution comprising at least one hydrocarbon liquid; and
    (iii) an effective amount of a surfactant or surfactant mixture so as to from an inverse emulsion or microemulsion; and
  (b) subjecting the emulsion obtained in step (a) to polymerization conditions to produce an emulsion of a water-soluble polymer based polymer having a particle diameter ranging from about 200 to about 4000 Å in diameter.

10. A process according to claim 9 wherein said monomer comprises acrylamide.

11. A process according to claim 9 wherein said monomer comprises an acrylamide; a hydroxyalkyl(alk)acrylate; an N,N-dialkylaminoalkyl(alk) acrylate or an allyl amine.

12. A process as defined in claim 1 wherein said functionalizing agent is selected from amide; aldehyde; amine; epoxy; chlorohydrin; methylol or N-haloamide group containing compounds.

13. A process as defined in claim 2 wherein said functionalizing agent is selected from aldehyde; amine; epoxy; chlorohydrin; amide; methylol or N-haloamide group containing compounds.

14. A process as defined in claim 9 wherein said functional group is an amide; aldehydes; amine; epoxy; chlorohydrin; methylol or N-haloamide group.

15. A process according to claim 14 wherein said group is an aldehyde group.

16. A process for the preparation of a water-soluble polymer-based polymer having functional groups which continually self cross-link said polymer at ambient conditions said polymer being in a form where substantially all of the polymer is present as discrete particles having diameters of between about 200 and about 4000 Å which comprises:
  (a) admixing
    (i) an aqueous solution of at least one monomer containing a group capable of being transformed into a functional group, said monomer being capable of forming a water-soluble polymer, 1) alone or in conjunction with another monomer or 2) after said group has been transformed into a functional group,
    (ii) an oil solution comprising at least one hydrocarbon liquid and,
    (iii) an effective amount of a surfactant or surfactant mixture, so as to form an inverse emulsion or microemulsion and,
  (b) subjecting the emulsion obtained in step a) to polymerization and transformation conditions to produce an emulsion of a water-soluble polymer based polymer having particle diameters ranging from about 200 to about 4000 Å.

17. A process as defined in claim 16 wherein said monomer comprises an acrylamide; a hydroxyalkyl(alk)acrylate; an N,N-dialkylaminoalkyl(alk)acrylate or an allyl amine.

18. A process according to claim 16 wherein said monomer comprises acrylamide.

19. A process according to claim 9 including the step of c) inverting the functionalized polymeric material microemulsion.

20. A process according to claim 16 including the step c) inverting the functionalized polymeric material microemulsion.

* * * * *